April 16, 1935.  G. W. SWIFT, JR  1,997,608
VARIABLE SPEED CUTTING MECHANISM
Filed Jan. 3, 1933  5 Sheets-Sheet 1

INVENTOR
George W. Swift, Jr.
BY
Knight Bro.
ATTORNEYS

April 16, 1935.   G. W. SWIFT, JR   1,997,608
VARIABLE SPEED CUTTING MECHANISM
Filed Jan. 3, 1933   5 Sheets—Sheet 2

INVENTOR—
George W. Swift, Jr.
BY
Knight Bro
ATTORNEYS

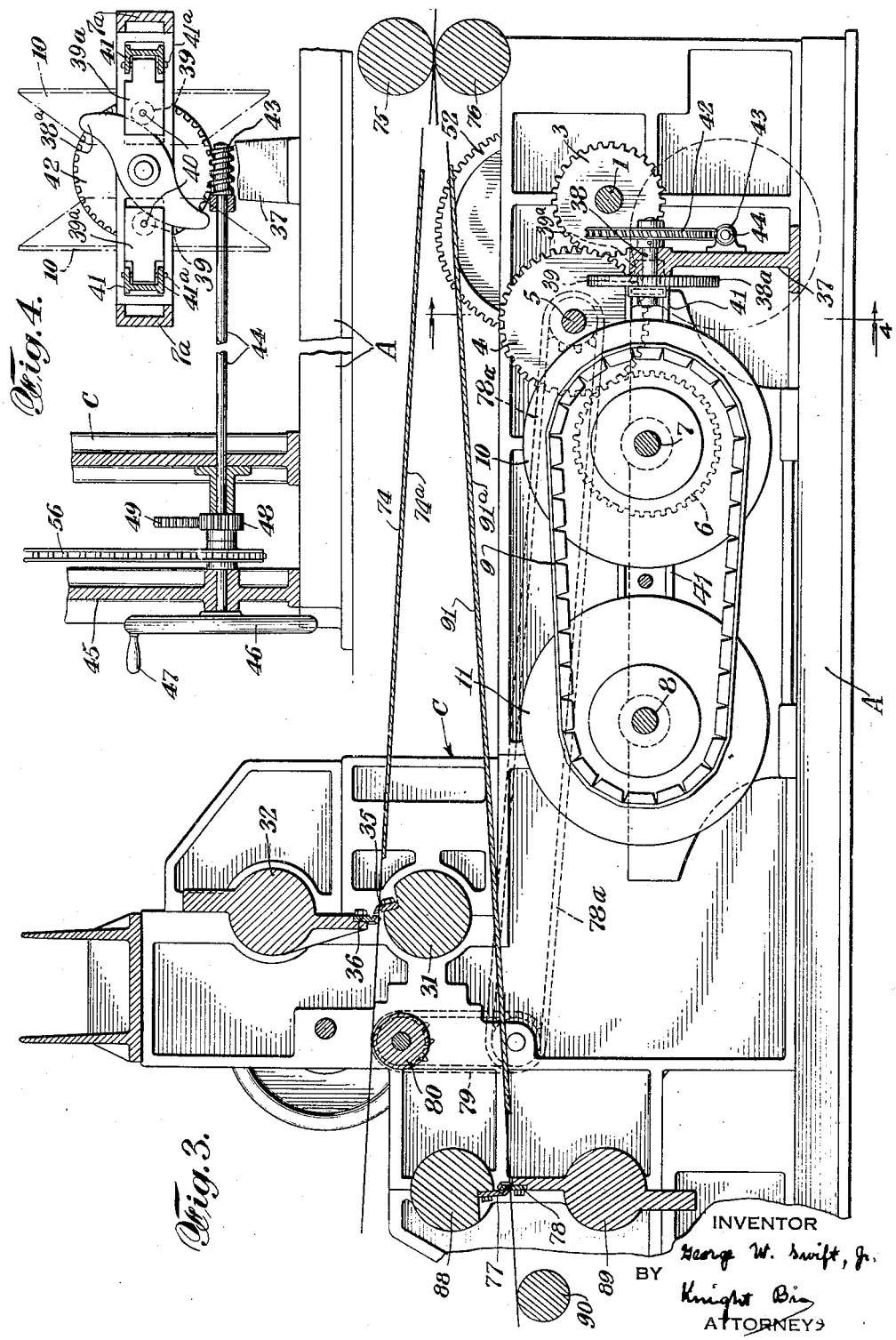

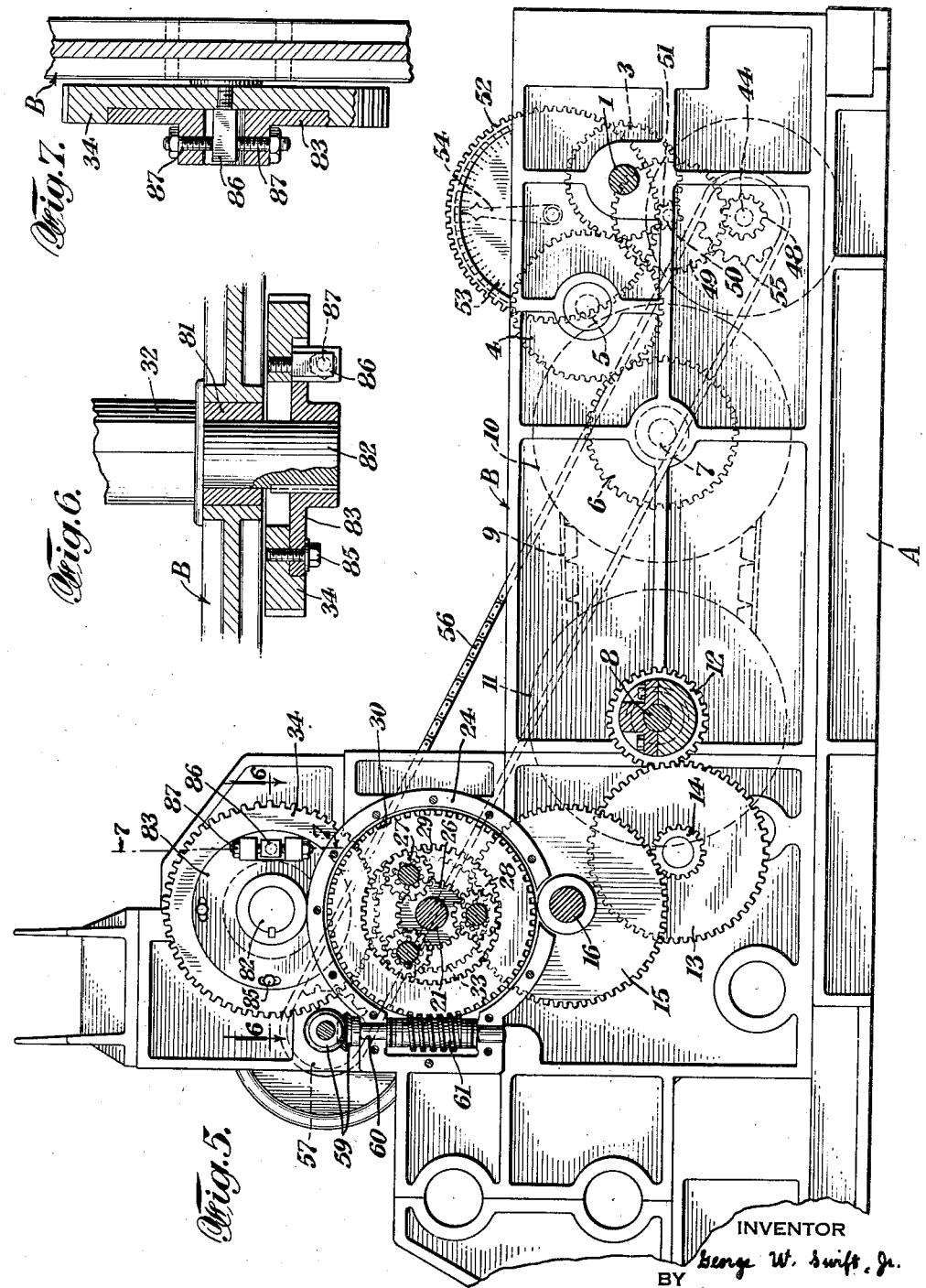

April 16, 1935.  G. W. SWIFT, JR  1,997,608
VARIABLE SPEED CUTTING MECHANISM
Filed Jan. 3, 1933  5 Sheets-Sheet 5
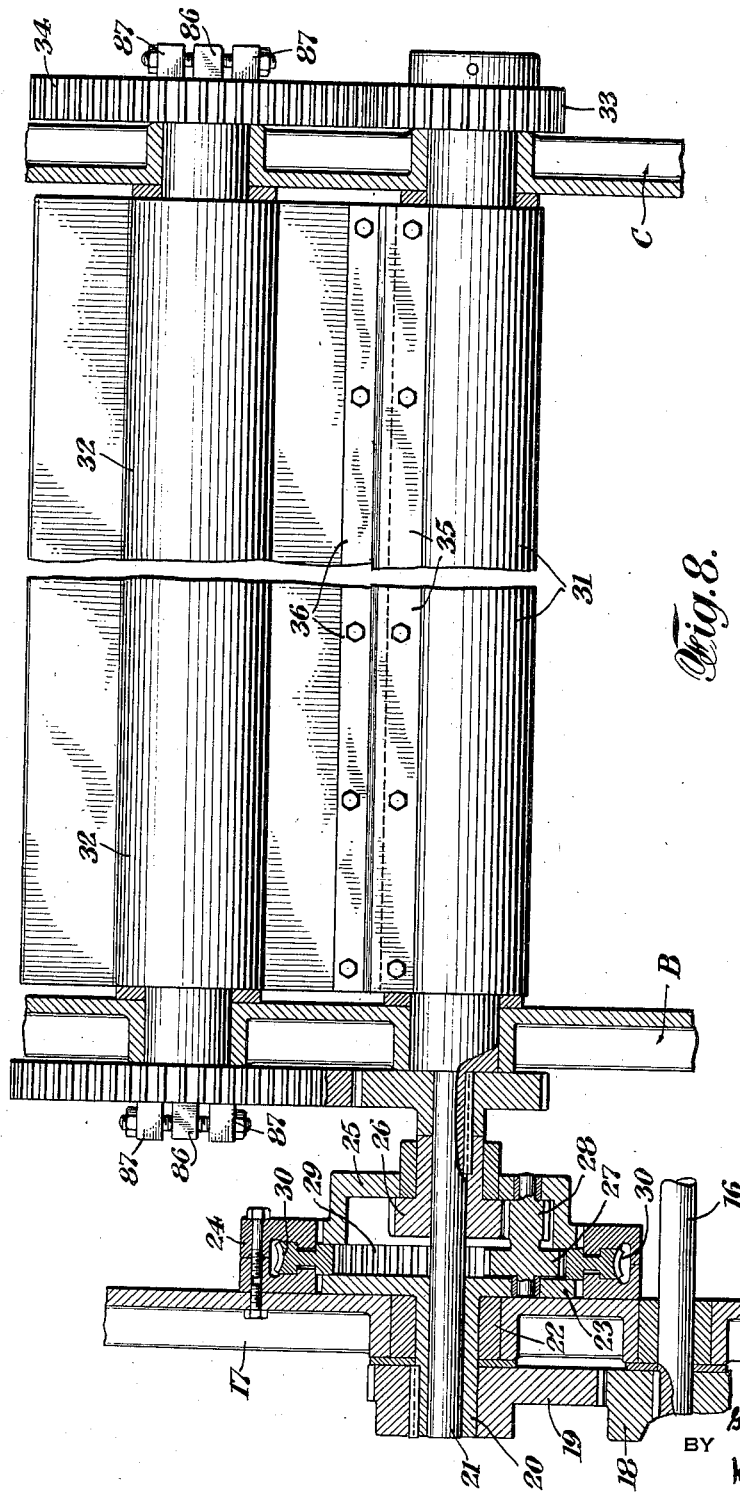

Patented Apr. 16, 1935

1,997,608

UNITED STATES PATENT OFFICE 1,997,608

VARIABLE SPEED CUTTING MECHANISM

George W. Swift, Jr., Bordentown, N. J., assignor to George W. Swift, Jr., Inc., Bordentown, N. J., a corporation of New Jersey Application January 3, 1933, Serial No. 649,872

REISSUED

17 Claims. (Cl. 164—66)

This invention relates more especially to that type of variable speed cutting mechanism in which cooperating cutter blades are caused to revolve continuously about spaced axes and into and out of cutting position with respect to a continuously moving web from which, during any particular run off, successive portions or sections of uniform length are to be severed. In machines of this character and type, when the machine has completed its output of sections of a particular length and it is desired to prepare the machine for an output of sections of a different length, it is usual to maintain the speed of the web constant while changing the frequency or periodicity of the cutting operations and this has led to the necessity of incorporating some device for accelerating or decelerating the linear cutting speed of the blades for the purpose of making the cutter blades travel at the same speed as the web during each cutting action. According to the present invention, an improved construction and arrangement of parts are provided in mechanism of this character for making the peripheral speeds of the cutter blades momentarily equal to the speed of the web at each shearing operation for any desired frequency or periodicity in the cutting operation, while at the same time making the cutting speed of the revolving cutter blades momentarily correspond to the velocity of the web while the cut is proceeding. More especially, the present invention contemplates an adaptation of this device to a duplex or multiplex cutting operation on a plurality of webs moving continuously forward at the same constant velocity and particularly in connection with the contemporaneous cutting of uniform lengths from each of the laterally parted sections formed by the longitudinal slitting of a continuous web of corrugated board. In an operation of this kind, it is of great importance to avoid excess bending of the composite board coming directly from a corrugated board machine, for the reason that the paper has not become perfectly dry, nor has the silicate of soda (which is usually employed for an adhesive) become completely cured. To avoid these drawbacks, the present invention contemplates an improved construction, arrangement and automatic regulation of a plurality of pairs of cooperating cutter blades which operate on the laterally parted sections of the corrugated board without unduly bending the partially dried product which would otherwise cause distortion and a pulling away of the layers.

In the drawings which represent a preferred embodiment of my invention,

Figure 3 is a longitudinal section of the machine with parts shown in side elevation.

Figure 4 is a transverse section corresponding to the line 4—4, of Figure 3.

Figure 5 is a side elevation of the machine with the differential mechanism shown in section.

Figure 6 is a fragmentary horizontal section on the line 6—6 of Figure 5.

Figure 7 is a fragmentary vertical section on the line 7—7 of Figure 5.

Figure 8 is an enlarged vertical transverse section of the differential mechanism and contiguous driving connections with the cutter blades shown in elevation in their relative positions during the cutting operation, parts being broken away.

Figures 9 and 10 are transverse detail sections of the cutter blades in cooperating cutting position with the elliptical gears shown in elevation in corresponding positions under different speed ratios for forming sections of different lengths.

Figure 1:
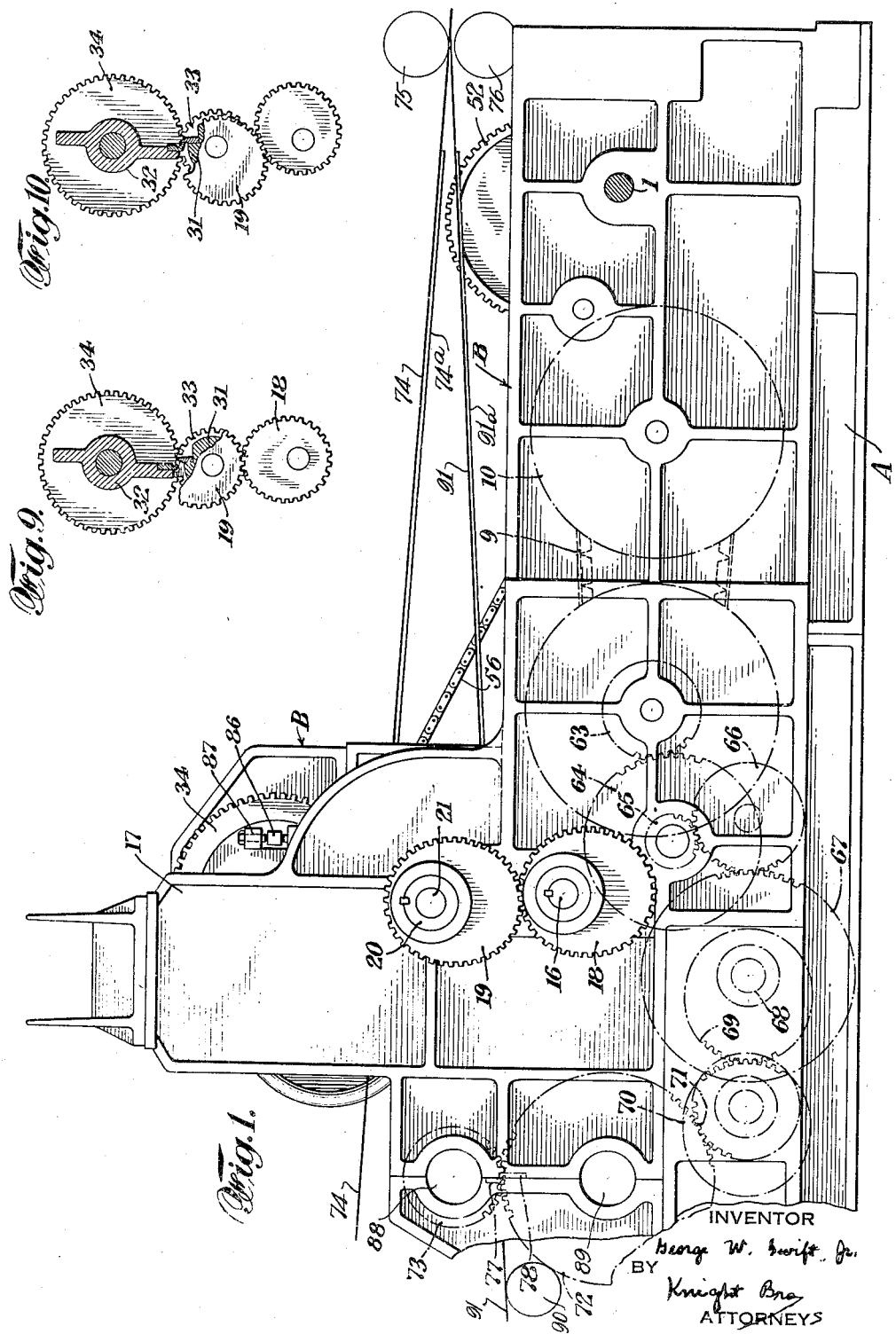
Figure 1 is a side elevation of a complete machine embodying the principles of my invention.
Figure 2:
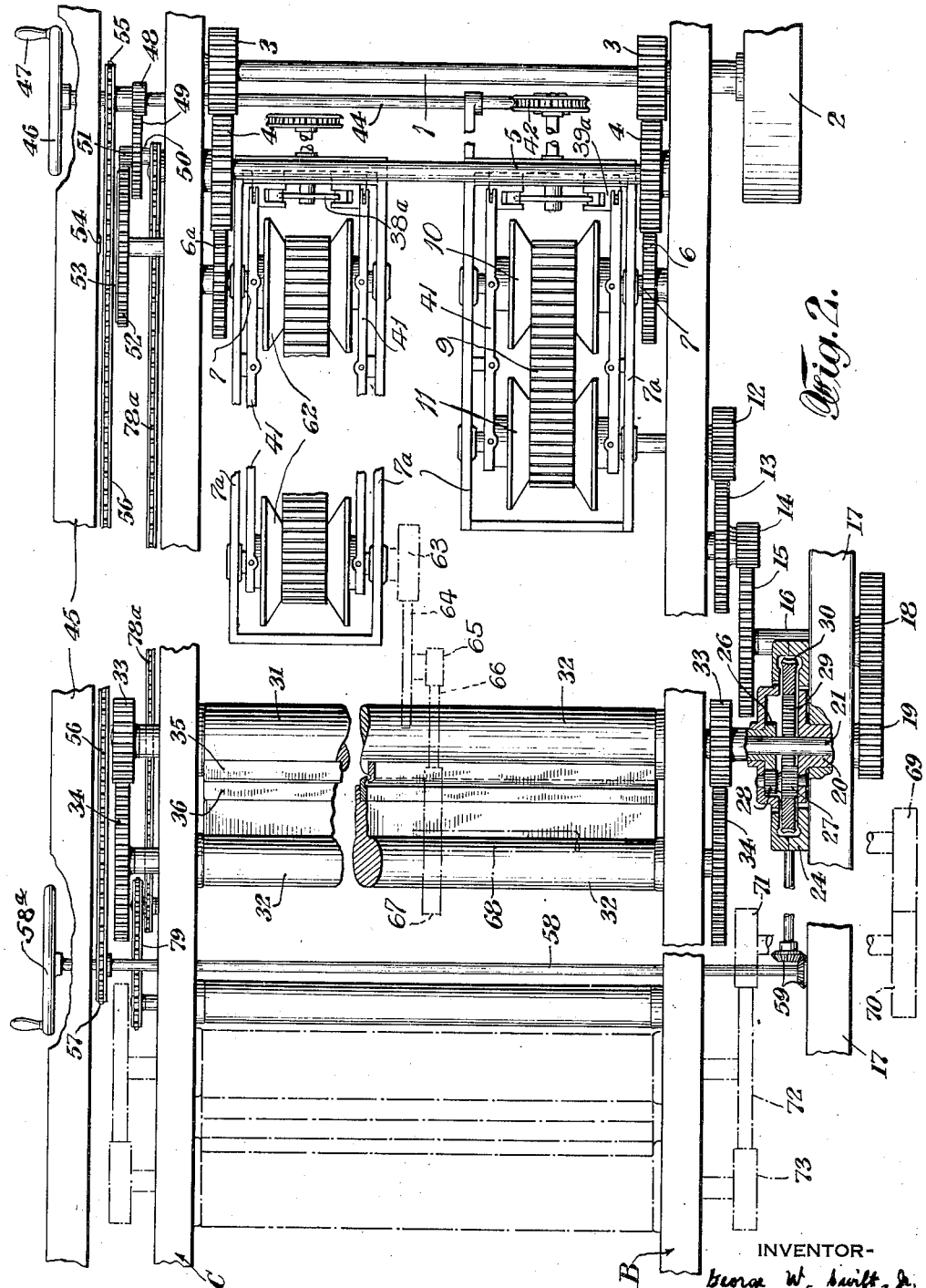
Figure 2 is a schematic plan view of the operating connections, parts being broken away and parts shown in section.

Referring more especially to Figures 1 and 2 of the drawings, the main frame of the machine comprises a bed frame A and laterally spaced side frames B and C. Journalled in the side frames B and C as shown best in Figure 2 of the drawings, is a main drive shaft 1 which may be provided on its outer end with a pulley 2 by means of which power may be delivered thereto. The main drive shaft carries axially spaced pinions 3, 3, which drive spur gears 4, 4, on a transverse shaft 5, said spur gears 4, 4, being arranged to transmit power to spur gears 6, 6, which are keyed to axially spaced shafts 7, 7, said shafts 7, 7, being the constant speed shafts of laterally-spaced variable speed transmission mechanisms which are arranged to drive two variable speed cutting mechanisms, said cutting mechanisms being operable simultaneously for operating on two different continuously moving webs. As the construction and operation of the variable speed cutting mechanisms are substantially similar, a description of one will serve for both. The constant shaft 7 may be connected to the variable speed shaft 8 of the variable speed drive by means of an endless belt 9, of V-shaped cross-section which operates between two pairs of axially adjustable cone disks 10—10 and 11—11 which are splined to the constant and variable speed shafts respectively. It will be understood from this description that the cone disks of each shaft may be adjusted toward and away from each other in conjunction with the corresponding cone disks on the other shaft for changing the velocity ratios at which power is transmitted. As shown best in Figure 2 of the drawings, the variable speed shaft of the Reeves drive carries a pinion 12 which meshes with the larger spur gear 13 of a compound gear, the smaller spur gear 14 of said compound gear being in mesh with a large spur gear 15 which is keyed to a short shaft 16, said shaft 16 journalled in an out-rigger frame 17 which is spaced from the side frame B. Keyed to the shaft 16 on the outside of out-rigger frame 17 is a lower elliptical gear 18 which meshes with an upper elliptical gear 19. As shown in Figure 8 of the drawings, the upper elliptical gear 19 is keyed to a tubular differential shaft 20 which is journalled on one end of a lower cutter shaft 21 and within a bearing 22 in the out-rigger frame 17. On its inner end, the tubular differential shaft 20 is provided with an integrally formed plate or disk 23 which forms one side of a rotary cage or differential housing which rotates about the axis of the lower cutter shaft 21 with an annular channeled frame 24 which is bolted to the inner side of out-rigger frame 17. The other side 25 of the rotary cage, is journalled upon the hub of a spur gear 26 which is keyed to the lower cutter shaft 21. Journalled in the rotary cage, are a plurality of compound planetary gears each of said planetary gears comprising a larger spur gear 27 and a smaller spur pinion 28. The spur pinions 28 mesh with the spur gear 26 on the lower cutter shaft while the spur gears 27 mesh with and travel around an annular track gear 29 which is rotatably adjustable in the channeled frame 24 and carries an outwardly presented worm gear 30 for its adjustment in the manner hereinafter described. Journalled in the side frames B and C are lower and upper drums 31 and 32 which are geared together to rotate in unison by means of spur gears 33, 33, and 34, 34, said spur gears 33, 33, being keyed to the lower cutter shaft 21. Mounted on the drums 31 and 32, are lower and upper helical cutter blades 35 and 36 which are thus adapted to be revolved about the spaced axes of the upper and lower cutter shafts. By means of the coordinating adjustment connections to be presently described, the lengths of the successive sections cut from the composite board may be varied at will by changing the periodicities of the cutting operation of the upper and lower cutter blades operating thereon, while at the same time, the cutting speeds of the upper and lower cutter blades may be automatically modified to conform to the linear speed of the web by varying the setting of the cutter blades with respect to the elliptical gears.

Referring now to Figures 3 and 4 of the drawings, suitable means for adjusting the variable speed drive for varying the periodicity of the cutting operation and changing the lengths of the severed sections, may be provided as follows. Journalled in a standard 37, is a short shaft 38 to one end of which is keyed a double lobed cam 38a. In rolling contact with each lobe of said cam 38a is a cam roller 39 which is journalled on a pin 40 which projects laterally from a cam block 39a. The oppositely arranged cam blocks 39a are pivotally connected at 41a to the laterally spaced adjustment levers 41 of the Reeves drive. Keyed to the outer end of the shaft 38, is a worm wheel 42 which is rotatable by a worm 43 keyed to the inner end of a shaft 44 which extends outwardly through the side frame C and beyond a second out-rigger frame 45. Keyed to the outer end of the adjustment shaft 44 is a hand-wheel 46 which carries a handle 47 for rotating the adjustment shaft and thus varying the transmission speed of the variable speed drive. As shown in dotted lines in Figure 5 of the drawings, the adjustment shaft 44 carries a small pinion 48 which meshes with a larger spur gear 49 on a short shaft 50 to which is keyed a small pinion 51. The pinion 51 meshes with a large spur gear 52 which carries a graduated dial plate 53, the amount of the angular movement of said dial plate in either direction being measured by a fixed pointer arm 54. Keyed to the shaft 44 is a sprocket wheel 55 which is connected by an endless chain 56 to an upper sprocket wheel 57 keyed to a cross shaft 58. The shaft 58 is connected by bevelled pinions 59 to the upper end of a vertical shaft 60 which carries a worm 61 and this worm meshes with the worm gear 30 which forms an integral portion of the internal gear 29 for adjusting the differential housing. It will be understood from this description that whenever the adjustment shaft is moved to impart a certain predetermined setting of the differential drive, this adjustment will be accompanied by the corresponding movement of the differential housing and thereby cause the planetary gears to rotate the lower cutter shaft and thus advances or retreats the upper and lower cutter blades relatively to the intermeshing elliptical gears. The result of this adjustment will be to vary the velocity of said blades during the cutting operation to conform to the speed of the web.

Referring again to Figures 1 and 2, my invention also contemplates a second variable speed cutting mechanism which is substantially similar in construction and arrangement to that already described. This second cutting mechanism with its variable speed drive and operating connections including variable ratio gearing and differential mechanism, has been constructionally indicated on these figures of the drawings. Thus a variable speed drive 62 delivers power to a second pair of upper and lower cutter shafts 88 and 89 through a chain of gears comprising spur gear 63, compound gear 64, 65, idler 66, spur gear 67, shaft 68, elliptical gears 69 and 70, differential gearing (not shown on the drawings), spur gear 71 and gears 72 and 73 on the lower and upper cutter shafts, respectively. Said differential gearing which is similar in construction to that already described in connection with the first cutting mechanism, is interposed between the driven elliptical gear 70 and the spur gear 71 and is adapted to function in the same way as the differential gearing through which the first cutting mechanism is driven. The preferred construction shown on the drawings contemplates in the upper cutter mechanism a lower cutter blade which revolves twice for each revolution of the upper cutter blade and in the lower cutter mechanism an upper cutter blade which revolves twice for each revolution of the lower cutter blade. For this purpose, the pitch diameter of the spur gears 34, 34, of the upper cutter mechanism is made twice that of the spur gears 33, 33, the same ratio being provided for between the gears 89, 89, of the lower cutter mechanism and the gears 88, 88. At the same time, it is further preferred to employ two intermeshing elliptical gears of the same size for each cutting mechanism, each of said elliptical gears being provided with a maximum radius twice as large as its minimum radius so that the variation in the speed ratio transmission during a single complete revolution of each pair of these gears, produces a maximum speed which is four times that of the minimum speed. Thus as shown in Figure 9 of the drawings, the elliptical gears are disposed to provide a two to one speed ratio in the transmission of power as the cutter blades come into opposition, whereas after 180 degrees of revolution, the speed ratio will become one to two. A speed ratio of one to one is indicated in Figure 10 of the drawings. It will be understood therefore that with a web travelling at uniform velocity past the cutter blades, the cutting speeds of the cutter blades may be varied to cut a section say 60 inches long with the arrangement shown in Figure 10; or a section 120 inches long by the arrangement shown in Figure 9; or a section 30 inches long by bringing the cutter blades into conjunction when the smallest radius of the lower elliptical gear drives on the largest radius of the upper elliptical gear. As indicated in Figure 1 of the drawings, the second cutter mechanism is preferably arranged with the shorter radius cutter blade 77 arranged above the longer radius cutter blade 78. This arrangement is of peculiar importance when employed for the simultaneous cutting of a plurality of webs formed by the lengthwise slitting of corrugated board coming directly from a corrugated board machine. Thus, in a machine of this character, the paper has not become perfectly dry nor has the silicate of soda, which is used as the adhesive, become completely cured. In consequence, excessive bending of the composite board may cause distortion of the product and a pulling away of the layers. To avoid this drawback, the present arrangement of two pairs of cutters of unequal radii with the smaller cutting radius of the upper pair arranged below and the small cutting radius of the lower pair arranged above, permits the cutting operations to be carried on without excessive bending of the incompletely dried board. Thus, as shown in Figures 1 and 3 of the drawings, as the webs 74 and 91 (resulting from the previous longitudinal slitting of a continuous strip of corrugated board coming from a corrugated board machine) emerge from between the feed-rolls 75 and 76, they move at divergent angles from a common horizontal plane over feed boards 74a and 91a to the upper and lower pairs of transverse cutter blades 35, 36, and 77, 78, respectively. By an inspection of Figure 3 of the drawings, it will be understood that by delivering the longitudinally parted sections or webs to the upper and lower pairs of cutter blades in divergent planes which deviate equally above and below their common horizontal plane of movement prior to their emergence from between the feed rolls 75, 76, and by placing the cutter blade of each pair which has the smaller orbit of movement between said divergent planes at different distances from the feed rolls 75 and 76 and one behind the other in respect thereto, the amount of bending to which each web is subjected can be reduced to such an extent as to obviate undue strain upon the undried adhesive or pulling away of the joined layers which form the corrugated board and prevent undesirable distortion of the product. As a result, the successive portions cut from the continuous webs 74 and 91 by the upper and lower pairs of cutter blades, will be delivered in good condition over the upper and lower delivery feed rolls 80 and 90 respectively.

It will be seen from the foregoing description that my present invention enables a duplex cutting operation to be carried on by one and the same machine in such a way that two webs (preferably derived from the longitudinally slitted continuous web coming from a corrugated board machine) may be fed at the same linear speed to different pairs of cutter blades which are constructed and arranged to operate thereon at the same or different periodicities. By this means, the successive sections cut from one continuous web may be the same as or different from those cut from the other continuous web in respect to length and breadth of the resulting sheets produced thereby. Due to the above-described construction, arrangement and duplex operation of a machine of this character, a great saving in time, labor, and material may be had.

As a detail of construction, it may be noted that a suitable rotary adjustment of the upper and lower cutter blades about their axes, is provided as follows. The upper cutter blade drum is journalled in bearings 81. Keyed to the journalled ends 82 of said drum is a circular flange 83 which is set into a circular recess in the outer wall of the spur gear 34, said spur gear being constructed in the form of a ring gear and secured by bolts 85 to the flange 83. Said flange 83 is provided with a radial notch of sufficient width to permit a limited circular adjustment of a stud or lug 86 which projects laterally from the gear 34. Threaded into two circularly spaced lugs which are integrally formed with and presented laterally from the flange 83, are two set screws 87 which impinge upon the stud or lug 86 for securing a limited movement of the upper cutter drum about its axis and a circular adjustment of the upper cutter blade with respect to the lower cutter blade. As shown in Figures 2 and 3 of the drawings, the cross shaft 5 may be connected by a horizontal sprocket chain 78a and a vertical sprocket chain 79 to the delivery roll 80.

As has been explained above, the cutting speed adjustment of the continuously revolving cutter blades is preferably under the control of the device for adjusting the speed ratio of the Reeves variable speed drive which transmits power to the cutting mechanism through the elliptical gears and differential mechanism. It will be understood, however, that the adjustment of the differential mechanism may be readily effected independently of the Reeves drive adjustment by, for example, removing the sprocket chain 56 (see Figure 2) which connects the upper adjustment shaft 58 to the lower adjustment shaft 44. In this event, the upper adjustment hand-wheel 58a which is rigidly secured to the shaft 58, may be employed solely for adjusting the differential mechanism for bringing the cutting speed into conformity with the speed of the web. The amount of this adjustment may be indicated by a dial and pointer (not shown on the drawings) similar to that described above for the Reeves drive adjustment.

I claim:—

1. In a machine of the character described, the combination of two pairs of cooperating cutter blades, each pair of said cutter blades being constructed to operate with a different periodicity in the cutting operation than that with which the other pair of said cutter blades operate, means for driving each pair of said cutter blades at variable velocity in each cycle of their movements, and means for variably timing the cutting operation of said cutter blades within each cycle of their movements for operating both pairs of cutter blades at the same cutting speed, said pairs of cutter blades being arranged to sever sections of different uniform lengths from each of two webs moving at the same velocity past said pairs of cutter blades respectively.

2. A machine of the character claimed in claim 1, in which said pairs of cutter blades are arranged to operate in planes divergent from and on opposite sides of a common plane in which said webs move prior to the cutting operations, the orbital paths of the cutter blades which operate between the divergent cutting planes being disposed at different distances from a common line of intersection of said divergent planes with said common plane.

3. In a machine of the character described, the combination of two pairs of cooperating cutter blades, each pair of said cutter blades being constructed and arranged to operate upon a web moving in a different plane of movement than the web operated upon by the other pair of said cutter blades, means for feeding said webs at the same velocity in different planes of movement past the cutting positions of the respective pairs of cutter blades from a plane of movement common to said webs prior to the cutting operations, a variable speed drive for varying the periodicity of the cutting operations of one pair of cutter blades with respect to the other pair of cutter blades, and operating connections between said variable speed drive and the cutter blades driven thereby, said operating connections including variable ratio gearing and differential mechanism for operating the last-mentioned cutter blades at different periodicities with a cutting speed equal to the velocity of said webs.

4. In a machine of the character described, the combination of two pairs of cooperating cutter blades, said pairs of cutter blades being constructed and arranged to operate upon webs moving continuously at the same uniform velocity, and means for feeding said webs at the same constant speed in different planes of movement past the cutting positions of the respective pairs of cutter blades, a variable speed drive for each of said pairs of cutter blades whereby the periodicity of the cutting operations of each pair of cutter blades may be varied in respect to the other, and operating connections between each variable speed drive and the cutter blades to which it is connected, said operating connections including variable ratio gearing for varying the velocity of the cutting blades during each cycle of operations and differential mechanism interposed between said variable ratio gearing and said cutter blades whereby the cutter blades may be advanced or retreated relatively to said variable ratio gearing for maintaining the cutting speeds of both pairs of cutter blades equal to the common speed of said webs and constant for all periodicities in the cutting operations of both pairs of cutter blades.

5. A machine of the character claimed in claim 4, in which the variable speed drive for each pair of cutter blades comprises positively connected constant speed and variable speed shafts and in which said constant speed shafts for both variable speed drives are driven by the same power shaft.

6. A machine of the character claimed in claim 1, in which two pairs of cutter blades are constructed and arranged to operate upon webs moving in different planes of movement having equal angles of divergence above and below a common horizontal plane and in which each pair of said cutter blades project unequal distances from their respective axes of revolution, the cutter blade which projects less in each pair being arranged between said divergent planes.

7. In web cutting mechanism, the combination of two cutter shafts geared together to rotate in unison, a sun gear keyed to one of said cutter shafts, a circular rack gear coaxially arranged with respect to said cutter shaft and rotatable relatively thereto, planetary gearing intermeshing between said circular rack gear and said sun gear, means for revolving said planetary gearing about the axis of said shaft, said means including variable ratio gearing for varying the velocity of the cutter shafts during each rotation and a variable speed drive for varying the periodicity of the cutting operations, and means for adjusting said circular rack for maintaining the velocity of said cutter shafts constant for different periodicities in the cutting operation.

8. In web cutting mechanism, the combination of two cutter shafts geared together to rotate in unison, a sun gear keyed to one of said cutter shafts, a circular rack gear coaxially arranged with respect to said cutter shaft and rotatable relatively thereto, planetary gearing revolvable about the axis of said cutter shaft, said planetary gearing intermeshing between said sun gear and said circular rack, a power train for revolving said planetary gearing, said power train including intermeshing elliptic gears, and a variable speed drive provided with an adjustment control connected up with said circular rack gear.

9. In web cutting mechanism, the combination of two cutter shafts geared together to rotate in unison, a sun gear keyed to one of said cutter shafts, a sleeve journalled on said shaft and axially spaced from said sun gear, a circular rack gear coaxially arranged with respect to said cutter shaft and rotatable relatively thereto, planetary gearing interengaging between said sun gear and said circular rack gear and driven by said sleeve, an elliptic gear keyed to said sleeve, a second elliptic gear meshing with the first-mentioned elliptic gear, and a variable speed drive operatably connected to the second-mentioned elliptic gear.

10. In web cutting mechanism, the combination of two cutter shafts geared together to rotate in unison, a sun gear keyed to one of said cutter shafts, a sleeve journalled on said shaft and axially spaced from said sun gear, a circular rack gear coaxially arranged with respect to said cutter shaft and rotatable relatively thereto, a planetary gearing support rotatable about the axis of said cutter shaft and relatively to said sun gear, a compound gear journalled in said planetary gearing support on an axis revolvable about the axis of said shaft, said compound gear comprising gears respectively meshing with said circular rack gear and said sun gear, an elliptic gear keyed to said sleeve, a second elliptic gear meshing with the first-mentioned elliptic gear, and variable speed power-transmitting mechanism connected to the second-mentioned elliptic gear.

11. In web cutting mechanism, the combination of two cutter shafts geared together to rotate in unison, a fixed annular housing concentrically arranged with respect to one of said cutter shafts, said fixed annular housing being provided with an inwardly presented peripheral slot, a circular rack gear rotatably mounted in said peripheral slot and coaxially arranged with respect to said cutter shaft, means for rotating said circular rack relatively to said cutter shaft, a sun gear keyed to said cutter shaft, planetary gearing intermeshing between said circular rack and said sun gear and revolvable about said sun gear, and means including variable ratio gearing for revolving said planetary gearing.

12. In web cutting mechanism, the combination of two cutter shafts geared together to rotate in unison, cutter blades mounted on said cutter shafts respectively, a differential housing rotatable about the axis of one of said cutter shafts, said differential housing being provided with a peripheral slot, means including variable ratio gearing for rotating said differential housing, a circular rack gear slidably mounted in said peripheral slot and coaxially arranged with respect to said cutter shaft, means for rotating said circular rack gear in said peripheral slot and relatively to the cutter shaft with which it is concentric, a sun gear keyed to said cutter shaft within said differential housing, and a compound gear journalled in the lateral walls of said differential housing, said compound gear comprising gears respectively meshing with said circular rack gear and said sun gear.

13. In web cutting mechanism, the combination of two cutter shafts geared together to rotate in unison, cutter blades mounted on said cutter shafts respectively, a differential housing rotatable about the axis of one of said cutter shafts, said differential housing being provided with a peripheral slot, a fixed annular housing concentrically arranged with respect to said cutter and provided with an inwardly presented peripheral slot in register with said peripheral slot in the differential housing, a circular rack gear rotatably mounted in said inwardly presented peripheral slot of the fixed annular housing and presented inwardly within the peripheral slot in the differential housing, a sun gear keyed to said cutter shaft within said differential housing, a compound gear journalled in the lateral walls of said differential housing, said compound gear comprising gears respectively meshing with said circular rack gear and said sun gear, means for rotating said circular rack gear about the axis of said cutter shaft, and a power-transmitting train including variable ratio gearing connected to said differential housing.

14. In a machine of the character described, the combination of two pairs of cooperating cutter blades arranged to operate on webs moving at the same velocity past the respective pairs of said cutter blades, one pair of said cutter blades being constructed to operate with a variable periodicity in the cutting operation with respect to the other pair of said cutter blades, and operating connections for varying the cutting speed of the said one pair of cutter blades during each cycle of their movements whereby both pairs of cutter blades may be operated at the same cutting speed.

15. In a machine of the character described, the combination of two pairs of cooperating cutter blades arranged to operate on webs moving at the same velocity past the respective pairs of said cutter blades, one pair of said cutter blades being constructed to operate with a variable periodicity in the cutting operation with respect to the other pair of said cutter blades, and operating connections including variable ratio gearing for varying the cutting speed of the said one pair of cutter blades during each cycle of their movements and differential mechanism whereby the cutting opposition of said one pair of cutter blades may be variably timed with respect to said variable ratio gearing.

16. In a machine of the character described, the combination of two pairs of cooperating cutter blades, each pair of said cutter blades being constructed to operate with a different periodicity in the cutting operation than that with which the other pair of said cutter blades operate, each pair of said cutter blades being provided with operating connections including variable ratio gearing for transmitting power at variable velocity during each cycle of their movements, and differential mechanism for variably timing the cutting operation of said cutter blades with respect to said variable ratio gearing.

17. In a machine of the character described, the combination of two pairs of cutter blades, the cutter blades of each pair being movable into and out of cutting opposition at variable time intervals, operating connections for each pair of said cutter blades, said operating connections including variable ratio gearing for transmitting power to said cutter blades at variable velocity during each cycle of their movements, and differential mechanism interposed between said variable ratio gearing and said cutter blades for variably timing the cutting operation of said cutter blades with respect to said variable ratio gearing.

GEORGE W. SWIFT, JR.